US008025984B2

(12) United States Patent
Stamm

(10) Patent No.: US 8,025,984 B2
(45) Date of Patent: *Sep. 27, 2011

(54) PROTECTIVE LAYER FOR PROTECTING A COMPONENT AGAINST CORROSION AND OXIDATION AT HIGH TEMPERATURES, AND COMPONENT

(75) Inventor: Werner Stamm, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 1130 days.

This patent is subject to a terminal disclaimer.

(21) Appl. No.: 10/575,979

(22) PCT Filed: Sep. 8, 2004

(86) PCT No.: PCT/EP2004/010025

§ 371 (c)(1),
(2), (4) Date: Apr. 17, 2006

(87) PCT Pub. No.: WO2005/042802

PCT Pub. Date: May 12, 2005

(65) Prior Publication Data

US 2007/0065675 A1 Mar. 22, 2007

(30) Foreign Application Priority Data

Oct. 17, 2003 (EP) .................................. 03023644

(51) Int. Cl.
*B32B 15/04* (2006.01)
(52) U.S. Cl. ..................... 428/678; 428/680; 416/241 R
(58) Field of Classification Search .......................... None
See application file for complete search history.

(56) References Cited

U.S. PATENT DOCUMENTS

| 4,005,989 | A | 2/1977 | Preston |
| 4,034,142 | A | 7/1977 | Hecht |
| 5,154,885 | A | 10/1992 | Czech et al. |
| 5,268,238 | A | 12/1993 | Czech et al. |
| 5,273,712 | A | 12/1993 | Czech et al. |
| 6,280,857 | B1 | 8/2001 | Sommer et al. |
| 6,346,134 | B1 | 2/2002 | Russo et al. |
| 6,610,419 | B1 * | 8/2003 | Stamm .......................... 428/632 |
| 6,924,046 | B2 * | 8/2005 | Stamm .......................... 428/678 |
| 7,368,177 | B2 * | 5/2008 | Quadakkers et al. .......... 428/680 |
| 2003/0020715 | A1 | 1/2003 | Sakakura et al. |
| 2003/0207151 | A1 * | 11/2003 | Stamm .......................... 428/678 |
| 2004/0005477 | A1 * | 1/2004 | Stamm .......................... 428/678 |
| 2004/0180233 | A1 * | 9/2004 | Stamm .......................... 428/680 |

FOREIGN PATENT DOCUMENTS

| DE | 694 01 260 T2 | 5/1995 |
| EP | 0 194 392 A1 | 9/1986 |
| EP | 0 253 754 A1 | 1/1988 |
| EP | 0 412 397 A1 | 2/1991 |
| EP | 1 204 776 B1 | 5/2002 |
| EP | 1 306 454 A1 | 5/2003 |

(Continued)

*Primary Examiner* — Aaron Austin

(57) ABSTRACT

Known protective layers with a high Al and/or Cr content and additionally strengthened by Re form brittle phases which become more brittle during use under the influence of carbon. The protective layer according to the invention has the composition 0.5 to 2% rhenium, 24 to 26% cobalt, 15 to 21% chromium, 9 to 11.5% aluminum, 0.05 to 0.7% yttrium and/or at least one equivalent metal selected from the group consisting of scandium and the rare earth elements, 0 to 1% ruthenium, remainder cobalt and/or nickel and manufacturing-related impurities, and reveals scarcely any embrittlement caused by Cr/Re precipitates.

8 Claims, 4 Drawing Sheets

FOREIGN PATENT DOCUMENTS

| | | |
|---|---|---|
| EP | 1 319 729 A1 | 6/2003 |
| JP | 2003201533 A | 7/2003 |
| RU | 2147624 C1 | 4/2000 |
| RU | 2149202 C1 | 5/2000 |
| WO | WO 91/01433 | 2/1991 |
| WO | WO 91/02108 | 2/1991 |
| WO | 9612049 A1 | 4/1996 |
| WO | 9707252 A1 | 2/1997 |
| WO | WO 9955527 A2 * | 11/1999 |
| WO | WO 99/67435 | 12/1999 |
| WO | WO 00/44949 A1 | 8/2000 |
| WO | WO 01/09403 A1 | 2/2001 |

* cited by examiner

PROTECTIVE LAYER FOR PROTECTING A COMPONENT AGAINST CORROSION AND OXIDATION AT HIGH TEMPERATURES, AND COMPONENT

CROSS REFERENCE TO RELATED APPLICATIONS

This application is the US National Stage of International Application No. PCT/EP2004/010025, filed Sep. 8, 2004 and claims the benefit thereof. The International Application claims the benefits of European Patent application No. 03023644.2 filed Oct. 17, 2003. All of the applications are incorporated by reference herein in their entirety.

FIELD OF THE INVENTION

The invention relates to a protective layer for protecting a component against corrosion and oxidation at high temperatures as described in the claims, the component in particular being a component of a gas turbine, to a component as described in the claims and to a process as described in the claims.

The invention relates in particular to a protective layer for a component which consists of a nickel-base or cobalt-base superalloy.

BACKGROUND OF THE INVENTION

Numerous protective layers for metallic components which are intended to increase the corrosion resistance and/or oxidation resistance of the components are known from the prior art. Most of these protective layers are known under the collective name MCrAlX, where M stands for at least one of the elements selected from the group consisting of iron, cobalt and nickel, and further essential constituents are chromium, aluminum and X=yttrium, although the latter may also be partly or completely replaced by an equivalent element selected from the group consisting of scandium and the rare earth elements.

Typical coatings of this type are known from U.S. Pat. Nos. 4,005,989 and 4,034,142.

Furthermore, EP-A 0 194 392 has disclosed numerous special compositions of protective layers of the above type with admixture of further elements for various applications. In this context, the element rhenium with admixture levels of up to 10% by weight as well as numerous other elements that can optionally be added is mentioned. However, in view of the lack of more specific further ranges for possible admixtures, none of the protective layers described is qualified for special conditions, such as for example on rotor blades and guide vanes of gas turbines with high inlet temperatures which have to be operated for prolonged periods of time.

Protective layers which contain rhenium are also known from U.S. Pat. No. 5,154,885, EP-A 0 412 397, DE 694 01 260 T2 and WO 91/02108 A1. The disclosure on the action of rhenium which is revealed overall by these documents is incorporated in its entirety in the present disclosure.

EP 1 306 454 A1 likewise discloses a protective layer consisting of nickel, cobalt, chromium, aluminum, rhenium and yttrium. There are no details as to the nickel and cobalt levels.

U.S. Pat. No. 6,346,134 B1 discloses an MCrAlY layer, having a chromium content of from 20 to 35% by weight, an aluminum content of from 5 to 15% by weight, additions of hafnium, rhenium, lanthanum or tantalum as well as a high yttrium content of from 4 to 6% by weight.

U.S. Pat. No. 6,280,857 B1 discloses a high-temperature-resistant layer which includes the elements cobalt, chromium and aluminum based on nickel, with the optional addition of rhenium and necessary admixtures of yttrium and silicon.

EP 0253 754 91 provides details as to the application of a protective layer to a gas turbine component that is to be exposed to high thermal stresses.

The objective of increasing the inlet temperatures of both stationary gas turbines and aircraft engines is of considerable significance in the specialist field of gas turbines, since the inlet temperatures are important variables determining the thermodynamic efficiencies which can be achieved by gas turbines. The use of specially developed alloys as base materials for components which are to be exposed to high thermal stresses, such as guide vanes and rotor blades, and in particular the use of single-crystal superalloys, allows the use of inlet temperatures of well over 1000° C. Nowadays, the prior art permits inlet temperatures of 950° C. and above in the case of stationary gas turbines and 1100° C. and above in the case of gas turbines for aircraft engines.

Examples of the structure of a turbine blade or vane having a single-crystal substrate, which for its part may be of complex structure, are revealed by WO 91/01433 A1.

Whereas the physical load-bearing capacity of the base materials which have by now been developed for the highly stressed components does not present any major problems with a view to possible further increases in the inlet temperatures, protective layers have to be employed to achieve sufficient resistance to oxidation and corrosion. In addition to the sufficient chemical stability of a protective layer under the attacks expected from flue gases at temperatures of the order of magnitude of 1000° C., a protective layer also has to have sufficiently good mechanical properties, not least with a view to the mechanical interaction between the protective layer and the base material. In particular, the protective layer must be sufficiently ductile to enable any deformation of the base material to be followed and not to crack, since points of attack for oxidation and corrosion would be created in this way. This typically gives rise to the problem that an increase in the levels of elements such as aluminum and chromium, which can increase the resistance of a protective layer to oxidation and corrosion, leads to a deterioration in the ductility of the protective layer, which means that mechanical failure, in particular the formation of cracks, is likely under mechanical loading which usually occurs in a gas turbine. Examples of the reduction in the ductility of the protective layer brought about by the elements chromium and aluminum are known from the prior art.

WO 01/09403 A1 has disclosed a superalloy for a substrate which also contains rhenium. That document describes the fact that the intermetallic phases formed by rhenium reduce the long-term stability of the superalloy. This effect can be alleviated by the addition of ruthenium.

SUMMARY OF THE INVENTION

Accordingly, the invention is based on the object of providing a protective layer which has a good high-temperature stability with regard to corrosion and oxidation, good long-term stability and, moreover, is particularly well matched to mechanical stresses which are expected at a high temperature in particular in a gas turbine.

The object is achieved by the protective layer as claimed in the claims and the process for producing a protective layer as claimed in the claims.

The subclaims list further advantageous measures.

The measures listed in the subclaims can be combined with one another in advantageous ways.

The invention is based on the discovery, inter alia, that the protective layer has brittle chromium-rhenium precipitates in the layer and also in the transition region between the protective layer and the base material. These brittle phases, the formation of which increases over time and with use temperature, in operation lead to highly pronounced longitudinal cracks in the layer and in the layer/base material interface, with subsequent layer detachment. The interaction with carbon, which can diffuse out of the base material into the layer or diffuses into the layer through the surface during a heat treatment in the furnace, additionally increases the brittleness of the Cr—Re precipitates. The susceptibility to cracking is boosted still further by oxidation of the chromium-rhenium phases.

In this context, the influence of cobalt which determines thermal and mechanical properties is also important.

Another object of the invention is that of providing a component which offers increased protection against corrosion and oxidation.

The object is also achieved by the component as claimed in the claims, which is in particular a component of a gas turbine or steam turbine, and which has a protective layer of the type described above to protect against corrosion and oxidation at high temperatures.

BRIEF DESCRIPTION OF THE DRAWINGS

The invention is explained in more detail below. In the drawing.

DETAILED DESCRIPTION OF THE INVENTION

Figure 1:
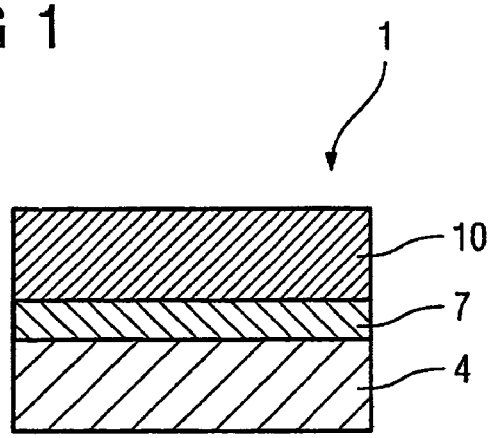
FIG. 1 shows a layer system having a protective layer.

According to the invention, a protective layer 7 (FIG. 1) for protecting a component against corrosion and oxidation at high temperature includes substantially the following elements (details of amounts in percent by weight):

0.5 to 2% rhenium,
15 to 21% chromium,
24 to 26% cobalt,
9 to 11.5% aluminum,
0.05 to 0.7% yttrium and/or at least one equivalent metal selected from the group consisting of scandium and the rare earth elements, remainder nickel and manufacturing-related impurities (NiCoCrAlY). The advantageous effect of the element rhenium is utilized to prevent the formation of brittle phases.

It should be noted that the levels of the individual elements are specifically adapted with a view to their actions as seen in conjunction with the element rhenium. If the levels are such that no chromium-rhenium precipitates are formed, brittle phases are advantageously not formed while the protective layer is in use, so that the service life is improved and lengthened.

This is achieved not only by a low chromium content but also, taking into account the influence of aluminum on the phase formation, by accurately setting the aluminum content.

Selecting 24 to 26% cobalt surprisingly significantly and disproportionately improves the thermal and mechanical properties of the protective layer 7.

With this narrowly selected range of cobalt, the initial and further formation of the γ' phase of the alloy, which normally leads to a peak in the coefficient of thermal expansion of the alloy, is particularly successfully suppressed. Otherwise, when the component having the protective layer 7 is heated up (i.e. when the turbine is started up), or in the event of other temperature fluctuations, this peak would cause high mechanical stresses (thermal mismatch) between protective layer 7 and substrate 4.

This is at least drastically reduced by the cobalt content which has been selected in accordance with the invention.

The reduction in the mechanical stresses effected by the selected cobalt content, in conjunction with the reduction of the brittle phases, which have an adverse effect in particular at relatively high mechanical properties, improves the mechanical properties.

The desired formation of the phase of the alloy is also particularly promoted by the cobalt content selected in accordance with the invention.

In this context, it is favorable to set the rhenium content at 1 to 1.8%, the chromium content at 16 to 18%, the aluminum content at 9.5 to 11% and the yttrium content at 0.3 to 0.5%.

The protective layer, with a good resistance to corrosion, also has a particularly good resistance to oxidation and is furthermore distinguished by especially good ductility properties, making it particularly well qualified for use in a gas turbine with a further increase in the inlet temperature. Scarcely any embrittlement occurs during operation, since the layer has scarcely any chromium-rhenium precipitates which become brittle during use. The superalloy contains no chromium-rhenium precipitates or at most 6% by volume of chromium-rhenium precipitates.

In this context, it is particularly expedient to set the rhenium content at approximately 1.5%, the chromium content at approximately 17%, the aluminum content at approximately 10%, the cobalt content at approximately 25% and the yttrium content at approximately 0.3%. Certain fluctuations result on account of large-scale industrial production, which means that yttrium contents of 0.2% to 0.3% or 0.2% to 0.4% are also used and likewise have good properties.

The trace elements in the powder to be sprayed, which form precipitates and therefore constitute sources of embrittlement, also play an important role. The powders are applied, for example, by plasma spraying (APS, LPPS, VPS, . . . ). Other processes also conceivable (PVD, CVD, . . . ).

The sum of the trace elements in the spraying powder is in total in particular <0.5% and is advantageously split as follows between a number of elements: carbon<250 ppm, oxygen<400 ppm, nitrogen 100 ppm, hydrogen<50 ppm.

The protective layer described also acts as a bonding layer to a superalloy.

Further layers, in particular ceramic thermal barrier coatings, can be applied to this layer.

In this component, the protective layer is advantageously applied to a substrate made from a nickel-base or cobalt-base superalloy.

A suitable substrate has in particular the following composition (details in percent by weight):

0.03 to 0.05% carbon,
18 to 19% chromium,
12 to 15% cobalt,
3 to 6% molybdenum,
1 to 1.5% tungsten,
2 to 2.5% aluminum,
3 to 5% titanium, optionally small quantities of tantalum, niobium, boron and/or zirconium, remainder nickel.

Materials of this type are known as forging alloys under the names Udimet 520 and Udimet 720.

Alternatively, the following composition is suitable for the substrate of the component (details in percent by weight):
0.1 to 0.15% carbon,
18 to 22% chromium,
18 to 19% cobalt,
0 to 2% tungsten,
0 to 4% molybdenum,
0 to 1.5% tantalum,
0 to 1% niobium,
1 to 3% aluminum,
2 to 4% titanium,
0 to 0.75% hafnium,
optionally small amounts of boron and/or zirconium, remainder nickel.

Compositions of this type are known as casting alloys under designations GTD222, IN939, IN6203 and Udimet 500.

A further alternative for the substrate of the component is the following composition (details in percent by weight):
0.07 to 0.1% carbon,
12 to 16% chromium,
8 to 10% cobalt,
1.5 to 2% molybdenum,
2.5 to 4% tungsten,
1.5 to 5% tantalum,
0 to 1% niobium,
3 to 4% aluminum,
3.5 to 5% titanium,
0 to 0.1% zirconium,
0 to 1% hafnium,
optionally a small quantity of boron, remainder nickel.

Compositions of this type are known as casting alloys PWA1483SX, IN738LC, GTD111, IN792CC and IN792DS; the material IN738LC is regarded as particularly preferred.

The following composition is considered a further alternative for the substrate of the component (details in percent by weight):
approximately 0.25% carbon,
24 to 30% chromium,
10 to 11% nickel,
7 to 8% tungsten,
0 to 4% tantalum,
0 to 0.3% aluminum,
0 to 0.3% titanium,
0 to 0.6% zirconium,
optionally a small quantity of boron, remainder cobalt.

Compositions of this type are known as casting alloys under the names FSX414, X45, ECY768 and MAR-M-509. The thickness of the protective layer on the component is preferably set to between approximately 100 µm and 300 µm.

The protective layer is particularly suitable for protecting a component against corrosion and oxidation when the component is exposed to a flue gas at a material temperature of around 950° C., and in the case of aircraft turbines even around 1100° C.

The protective layer according to the invention is therefore particularly qualified for protecting a component of a gas turbine, in particular a guide vane, rotor blade or other component, which is exposed to hot gas upstream of or in the turbine of the gas turbine.

The layer can be used as an overlay (the protective layer is the outer layer) or as a bond coat (the protective layer is an interlayer).

FIG. 1 shows a layer system 1 as a component. The layer system 1 comprises a substrate 4. The substrate 4 may be metallic and/or ceramic. In particular in the case of turbine components, such as for example turbine rotor blades 120 (FIG. 2) or turbine guide vanes 130 (FIGS. 3, 5), combustion chamber linings 155 (FIG. 4) and other housing parts of a steam or gas turbine 100 (FIG. 5), the substrate 4 consists of a nickel-base, cobalt-base or iron-base superalloy.

The protective layer 7 according to the invention is present on the substrate 4.

It is preferable for this protective layer 7 to be applied by LPPS (low pressure plasma spraying).

It can be used as the outer layer or as the interlayer.

In the latter case, a ceramic thermal barrier coating 10 is present on the protective layer 7.

The layer 7 can be applied to newly produced components and refurbished components.

Refurbishment means that after they have been used, layers (thermal barrier coating) may have to be detached from components and corrosion and oxidation products removed, for example by an acid treatment (acid stripping). If appropriate, cracks also have to be repaired. This is followed by recoating of a component of this type, since the substrate 13 is very expensive.

Figure 2:
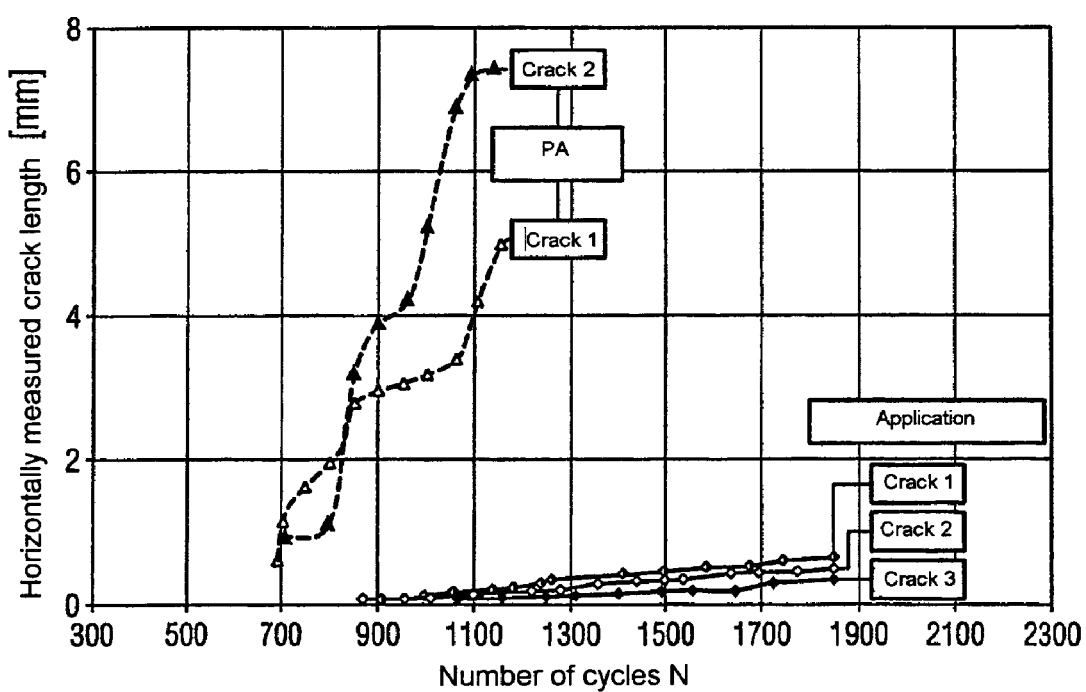
FIG. 2 shows test results of cyclical load tests.

FIG. 2 shows test results of load specimens which were subjected to cyclical loading.

The specimens were exposed to a defined mechanical, cyclical loading (oscillating loading) and cyclical temperature loading (TMF tests).

FIG. 2 shows the test results for a specimen having a composition in accordance with the present application (application) and test results for a layer in accordance with the prior art (PA), which has a composition in accordance with U.S. Pat. No. 5,154,885, U.S. Pat. No. 5,273,712 or U.S. Pat. No. 5,268,238.

The tests were carried out under elongation control at 0.51% elongation.

The layers were applied to a substrate designated PWA1484 (Pratt&Whitney alloy).

FIG. 2 plots the horizontally measured crack length against the number of cycles.

It is clearly apparent that the layer according to the prior art has cracks after just 700 cycles, and these cracks grow much more quickly than in a layer according to the application.

In the layer according to the application, cracks only start to occur at just below 900 cycles, and moreover these cracks are much smaller than in the layer according to the prior art. The crack propagation over the number of cycles is also significantly lower.

This demonstrates the superiority of the layer according to the invention.

Figure 3:
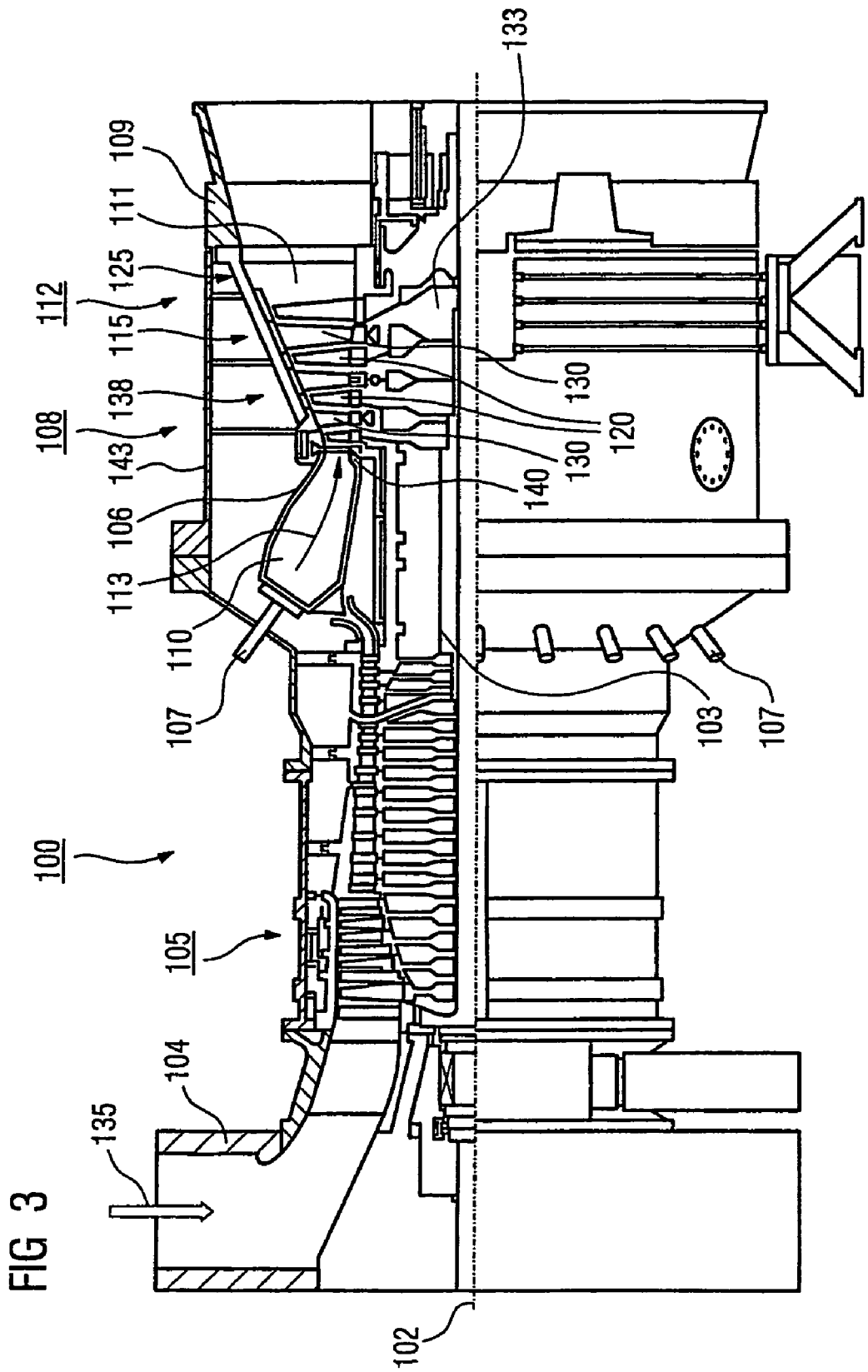
FIG. 3 shows a gas turbine.

FIG. 3 shows by way of example a partial longitudinal section through a gas turbine 100.

In its interior, the gas turbine 100 has a rotor 103 which is mounted such that it can rotate about an axis of rotation 102 and is also referred to as the turbine rotor.

An intake casing 104, a compressor 105, a for example toric combustion chamber 110, in particular an annular combustion chamber 106, with a plurality of coaxially arranged burners 107, a turbine 108 and the exhaust gas casing 109 follow one another along the rotor 103.

The annular combustion chamber 106 is in communication with a for example annular hot gas duct 111. There, by way of example four successive turbine stages 112 form the turbine 108.

Each turbine stage 112 is formed from two blade rings. As seen in the direction of flow of a working medium 113, a guide vane row 115 is followed in the hot gas duct 111 by a row 125 formed from rotor blades 120.

The guide vanes 130 are secured to an inner casing 138 of a stator 143, whereas the rotor blades 120 belonging to a row 125 are arranged on the rotor 103, for example by means of a turbine disk 133. A generator (not shown) is coupled to the rotor 103.

While the gas turbine 100 is operating, air 135 is drawn in through the intake casing 104 and compressed by the compressor 105. The compressed air provided at the turbine end of the compressor 105 is passed to the burners 107, where it is mixed with a fuel. The mixture is then burnt in the combustion chamber 110, forming the working medium 113.

From there, the working medium 113 flows along the hot gas duct 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 106, are subject to the highest thermal stresses.

To be able to withstand the temperatures which prevail there, they are cooled by means of a coolant.

The substrates may likewise have a directional structure, i.e. they are in single-crystal form (SX structure) or have only longitudinally oriented grains (DS structure).

The material used is iron-base, nickel-base or cobalt-base superalloys.

By way of example, superalloys as are known from EP 1204776, EP 1306454, EP 1319729, WO 99/67435 or WO 00/44949 are used. These documents form part of the present disclosure with regard to the composition of the superalloys and their advantages.

The blades or vanes 120, 130 have protective layers 7 according to the invention protecting against corrosion and oxidation (MCrAlX; M is at least one element selected from the group consisting of iron (Fe), cobalt (Co), nickel (Ni), X stands for yttrium (Y), silicon (Si) and/or at least one rare earth element) and/or against heat by means of a thermal barrier coating. The thermal barrier coating consists, for example, of $ZrO_2$, $Y_2O_4$—$ZrO_2$, i.e. unstabilized, partially stabilized or fully stabilized by yttrium oxide and/or calcium oxide and/or magnesium oxide.

Columnar grains are produced in the thermal barrier coating by means of suitable coating processes, such as for example electron beam physical vapor deposition (EB-PVD).

The guide vane 130 has a guide vane root (not shown here) facing the inner casing 138 of the turbine 108 and a guide vane head at the opposite end from the guide vane root. The guide vane head faces the rotor 103 and is fixed to a securing ring 140 of the stator 143.

Figure 4:
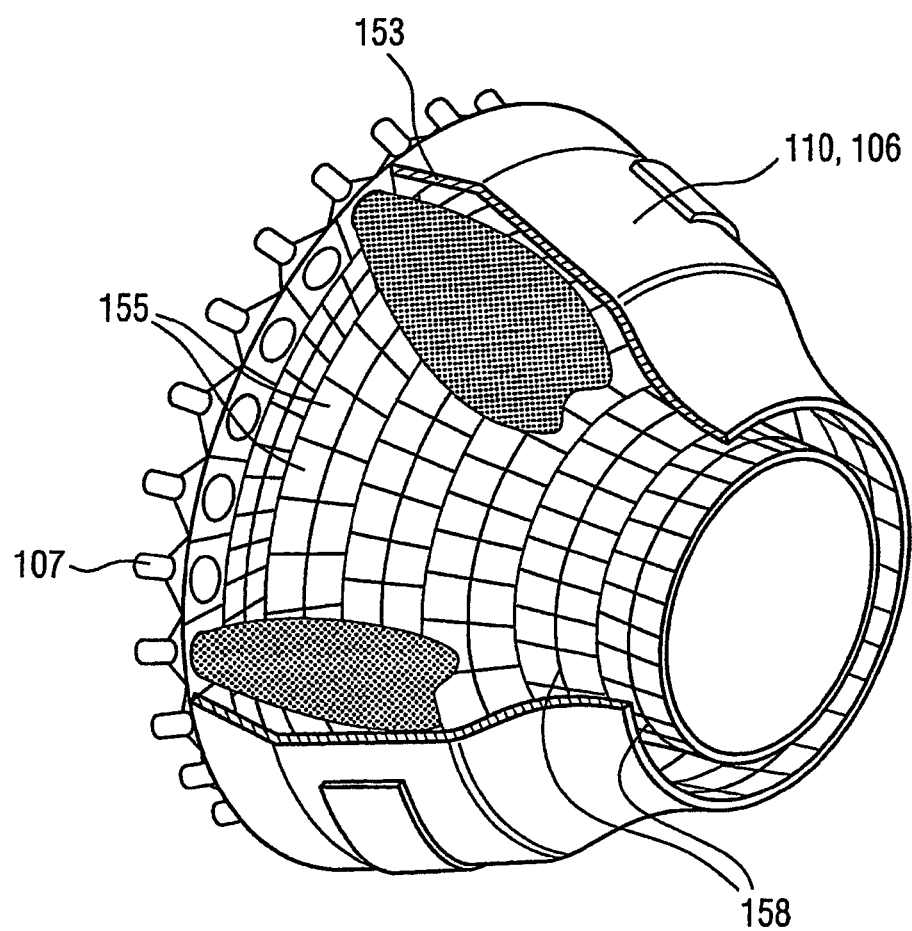
FIG. 4 shows a combustion chamber.

FIG. 4 shows a combustion chamber 110 of a gas turbine, which may have a layer system 1.

The combustion chamber 110 is configured, for example, as what is known as an annular combustion chamber, in which a multiplicity of burners 102 arranged circumferentially around the turbine shaft 103 open out into a common combustion chamber space. For this purpose, the combustion chamber 110 overall is of annular configuration positioned around the turbine shaft 103.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155. Each heat shield element 155 is equipped on the working medium side with a particularly heat-resistant protective layer or is made from high-temperature-resistant material and has the protective layer 7 shown in FIG. 1.

On account of the high temperatures in the interior of the combustion chamber 110, moreover, a cooling system is provided for the heat shield elements 155 and/or for their holding elements.

The materials of the combustion chamber wall and their coatings may be similar to the turbine blades or vanes 120, 130.

The combustion chamber 110 is designed in particular to detect losses of the heat shield elements 155. For this purpose, a number of temperature sensors 158 are positioned between the combustion chamber wall 153 and the heat shield elements 155.

Figure 5:
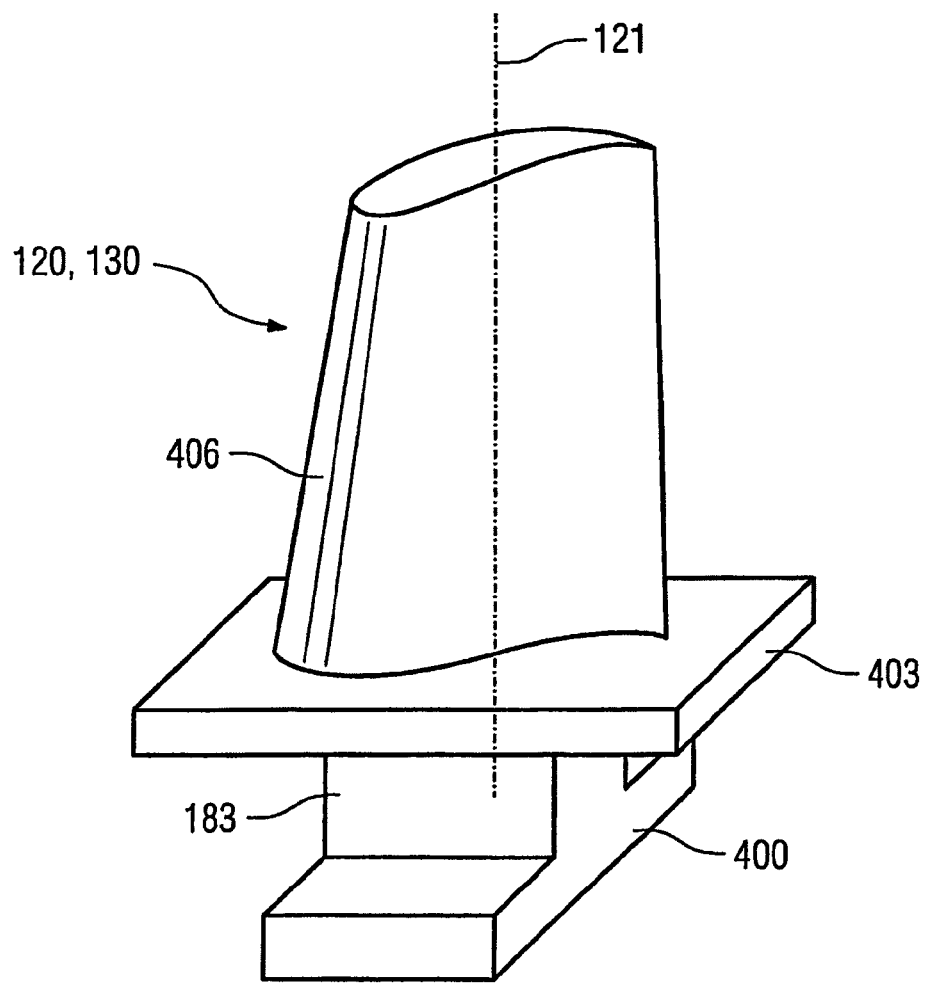
FIG. 5 shows a turbine blade or vane.

FIG. 5 shows a perspective view of a blade or vane 120, 130 which has a layer system 1 comprising the protective layer 7 according to the invention.

The blade or vane 120, 130 extends along a longitudinal axis 121.

The blade or vane 120, 130 has, in succession along the longitudinal axis 121, a securing region 400, an adjoining blade or vane platform 403 and a main blade or vane region 406. The protective layer 7 or a layer system 1 as shown in FIG. 1 is formed in particular in the main blade or vane region 406.

A blade or vane root 183, which is used to secure the rotor blades 120, 130 to the shaft, is formed in the securing region 400. The blade or vane root 183 is designed in hammerhead form. Other configurations, such as for example a fir-tree or dovetail root, are possible. In conventional blades or vanes 120, 130, solid metallic materials are used in all regions 400, 403, 406 of the rotor blade 120, 130. The rotor blade 120, 130 can in this case be produced by a casting process, by a forging process, by a milling process or combinations thereof.

The invention claimed is:

1. A protective alloy layer for protecting a component against corrosion and oxidation at high temperatures, comprising:

0.5 to 2% rhenium (% by weight);
16 to 18% chromium (% by weight);
24 to 26% cobalt (% by weight);
9 to 11.5% aluminum (% by weight);
0.05 to 0.7% yttrium (% by weight) or a metal selected from the group consisting of: scandium and the rare earth elements;
0.0 to 1% ruthenium (% by weight);
remainder nickel and manufacturing related impurities; and
wherein the protective layer contains at most 6% by volume of chromium-rhenium precipitates, and the concentration of cobalt relative to the concentration of the other elements in the alloy suppresses the formation of a ẏ phase of the alloy thereby avoiding a peak in a coefficient of thermal expansion of the alloy.

2. The protective layer as claimed in claim 1, comprising:
1 to 1.8% rhenium (% by weight);
9.5 to 11% aluminum (% by weight); and 0.3 to 0.5% yttrium (% by weight) or a metal selected from the group consisting of: scandium and the rare earth elements.

3. The protective layer as claimed in claim 2, comprising:
1.5% rhenium (% by weight);
17% chromium (% by weight);
25% cobalt (% by weight);
10% aluminum (% by weight); and
0.4% yttrium (% by weight) or a metal selected from the group consisting of scandium and the rare earth elements.

4. The protective layer as claimed in claim 1, wherein a thermal barrier coating is applied to the protective layer.

5. A high temperature gas turbine engine component, comprising:
a nickel or cobalt based super alloy substrate; and
a corrosion and oxidation protection layer arranged on the substrate, comprising:
0.5 to 2% rhenium (% by weight),
16 to 18% chromium (% by weight);
24 to 26% cobalt (% by weight),
9 to 11.5% aluminum (% by weight),
0.05 to 0.7% yttrium (% by weight) or a metal selected from the group consisting of: scandium and the rare earth elements;
0.0 to 1% ruthenium (% by weight),
remainder nickel and manufacturing related impurities; and,
wherein the protective layer contains at most 6% by volume of chromium-rhenium precipitates, and the concentration of cobalt relative to the concentration of the other elements in the alloy suppresses the formation of a ý phase of the alloy thereby avoiding a peak in a coefficient of thermal expansion of the alloy.

6. The high temperature turbine component as claimed in claim 5, wherein the protective layer comprises:
1 to 1.8% rhenium (% by weight);
9.5 to 11% aluminum (% by weight); and
0.3 to 0.5% yttrium (% by weight) or a metal selected from the group consisting of: scandium and the rare earth elements.

7. The high temperature turbine component as claimed in claim 6, wherein the protective layer comprises:
1.5% rhenium (% by weight);
17% chromium (% by weight);
25% cobalt (% by weight);
10% aluminum (% by weight); and
0.4% yttrium (% by weight) or a metal selected from the group consisting of scandium and the rare earth elements.

8. The high temperature turbine component as claimed in claim 7, wherein a thermal barrier coating is applied to the protective layer.

* * * * *